United States Patent
Himmele

(10) Patent No.: US 7,031,068 B2
(45) Date of Patent: Apr. 18, 2006

(54) SPORTS BINOCULAR VISOR ASSEMBLY AND METHOD

(76) Inventor: Tristram W. Himmele, 614 1st Ave. South, Lake Worth, FL (US) 33460

( * ) Notice: Subject to any disclaimer, the term of this patent is extended or adjusted under 35 U.S.C. 154(b) by 35 days.

(21) Appl. No.: 10/868,686

(22) Filed: Jun. 15, 2004

(65) Prior Publication Data

US 2004/0237176 A1    Dec. 2, 2004

Related U.S. Application Data

(63) Continuation-in-part of application No. 10/633,936, filed on Aug. 4, 2003, now abandoned, which is a continuation-in-part of application No. 10/117,989, filed on Apr. 6, 2002, now Pat. No. 6,614,603, which is a continuation-in-part of application No. 09/523,213, filed on Mar. 10, 2000, now Pat. No. 6,369,958.

(51) Int. Cl.
*G02B 27/14* (2006.01)
*G02B 7/02* (2006.01)
*G09G 5/00* (2006.01)
*A42B 1/24* (2006.01)

(52) U.S. Cl. ............... 359/630; 359/815; 345/8; 2/209.13

(58) Field of Classification Search ........ 359/630, 359/631, 632, 815, 407, 409, 410, 418, 511; 345/7, 8, 9; 348/115, 721, 157, 161; 2/209.13, 2/209.12, 6.5, 426; 351/123, 159
See application file for complete search history.

(56) References Cited

U.S. PATENT DOCUMENTS

| | | | | |
|---|---|---|---|---|
| 2,280,354 A | * | 4/1942 | Rezos | 359/408 |
| 2,649,019 A | * | 8/1953 | Hartline et al. | 359/409 |
| 2,887,928 A | * | 5/1959 | Misuraca | 356/25 |
| 2,986,969 A | | 6/1961 | Muncheryan | 88/41 |
| 3,597,041 A | | 8/1971 | Frantz | 350/72 |
| 3,741,634 A | | 6/1973 | Stoltle | 351/57 |
| 3,761,815 A | * | 9/1973 | Bower | 455/232.1 |
| 4,077,703 A | | 3/1978 | Pablo | 359/480 |
| 4,810,057 A | | 3/1989 | Dunkley | 350/139 |
| 4,877,318 A | | 10/1989 | Miles et al. | 350/569 |
| 4,953,766 A | | 9/1990 | Cruickshank | 224/181 |
| 5,023,706 A | * | 6/1991 | Sandberg | 348/838 |
| 5,179,735 A | | 1/1993 | Thomanek | 359/815 |
| 5,608,808 A | | 3/1997 | Da Silva | 351/123 |
| 5,634,201 A | | 5/1997 | Mooring | 455/90 |
| D386,298 S | | 11/1997 | Hancock | D3/218 |
| 5,715,323 A | | 2/1998 | Walker | 351/123 |
| 5,724,119 A | | 3/1998 | Leight | 351/158 |
| 5,767,820 A | | 6/1998 | Bassett et al. | 345/8 |

(Continued)

*Primary Examiner*—Loha Ben
(74) *Attorney, Agent, or Firm*—Clifford Kraft

(57) ABSTRACT

A hands-free binocular visor headgear for viewing sporting and other events where it is desirable to use binoculars but also have the free use of the hands. An adjustable head securing device secures the unit to the user's head. Binoculars or other optics are attached to the head securing device such that they can be pivoted between an in-use and a not in-use position and can be adjusted for a usercs eyes. The unit can also optionally contain removable or fixed earmuffs, a removable or fixed electronics module that can contain a radio, MPEG player or other electronics, removable or fixed earphone and/or a removable or fixed microphone. The user can pick and choose what exact equipment he or she needs for a particular sporting event.

14 Claims, 9 Drawing Sheets

U.S. PATENT DOCUMENTS

| | | | |
|---|---|---|---|
| 5,786,932 A | 7/1998 | Pniel | 359/409 |
| 5,815,126 A * | 9/1998 | Fan et al. | 345/8 |
| 5,828,437 A | 10/1998 | Hubert-Habart et al. | 351/44 |
| 5,880,773 A * | 3/1999 | Suzuki | 348/115 |
| 5,914,816 A * | 6/1999 | Soto et al. | 359/630 |
| 6,028,627 A * | 2/2000 | Helmsderfer | 348/157 |
| 6,046,712 A | 4/2000 | Beller et al. | 345/8 |
| 6,115,846 A | 9/2000 | Truesdale | 2/209.13 |
| 6,160,666 A | 12/2000 | Rallison et al. | 359/630 |
| 6,172,808 B1 | 1/2001 | Foreman et al. | 359/481 |
| 6,247,205 B1 | 6/2001 | Damadian | 24/3.12 |
| 6,305,026 B1 | 10/2001 | Mo | 2/209.13 |

* cited by examiner

SPORTS BINOCULAR VISOR ASSEMBLY AND METHOD

This application is a continuation-in-part of application Ser. No. 10/633,936 filed Aug. 4, 2003 now abandoned which was a continuation-in-part of application Ser. No. 10/117,989 filed Apr. 6, 2002, now U.S. Pat. No. 6,614,603 which was a continuation-in-part of application Ser. No. 09/523,213 filed Mar. 10, 2000, now U.S. Pat. No. 6,369,958. This application incorporates application U.S. Pat. No. 10/633,936, and U.S. Pat. Nos. 6,614,603 and 6,369,958 by reference.

BACKGROUND

1. Technical Field

The present invention relates to sporting event accessories and more particularly to a sports viewing assembly that can include binoculars and other equipment mounted on a piece of headgear.

2. Background Art

It is often desirable to use binoculars for better viewing the action while attending sporting events and the like. Although binoculars provide a useful mechanism for enhancing the viewing of the event, they are often bothersome because the user must continuously dedicate at least one hand to supporting the binoculars. It would be a benefit therefore, to have a binocular assembly that included a hands free support mechanism for supporting the binoculars in front of the user's eyes without using either of the user's hands.

SUMMARY OF THE INVENTION

The present invention relates to a hands-free headgear visor assembly that can contain binoculars and other convenient equipment to allow viewing and enjoying sporting and other events without the bother of having to hold the binoculars in the user's hands. It is important that the binoculars be adjustable both to fit the user's eyes and vertically.

It is thus an object of the present invention to provide a visor or other assembly that can include an adjustable head securing strap to hold the assembly mounted on a person's head and a user focusable binocular that can pivot between an in-use position and a not in-use position. Pivoting is accomplished by a hinge on the visor and not by simply rotating an external pair of binoculars upward.

The assembly can optionally contain an AM/FM radio or a radio scanner, an earphone or two earphones for the radio or scanner, camera, earmuffs for cold weather, and a laser or other type of rangefinder. If earmuffs are used, the earphone (s) can be removably mounted in the earmuff. It is within the scope of the present invention to provide either a single earphone or two earphones. The earphones can be separable and removable from the headgear assembly or can be integral. It should be noted, that all the components of the invention can be removable or fixed allowing the user to build up exactly the correct arrangement for any given event.

The present invention, in addition to being useful for viewing sports events and other distant objects can be used for surveillance as well as with macular degeneration patients.

DESCRIPTION OF THE DRAWINGS

For further understanding of the present invention, reference should be made to the following described drawings.

Figure 1:
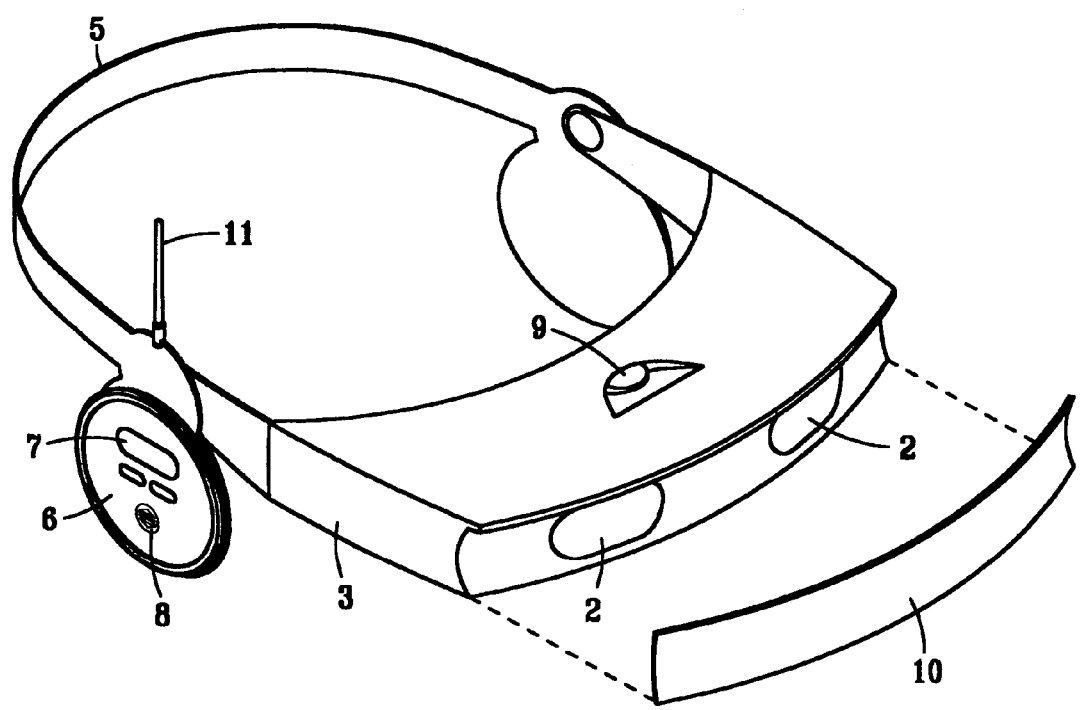
FIG. 1 is a perspective view of an embodiment of the invention containing a radio.

It should be understood that the above described figures are for the purpose of illustrating the present invention. One skilled in the art will recognize that many other embodiments and configurations are within the scope of the invention besides those shown in the drawings.

DETAILED DESCRIPTION

Figure 3:
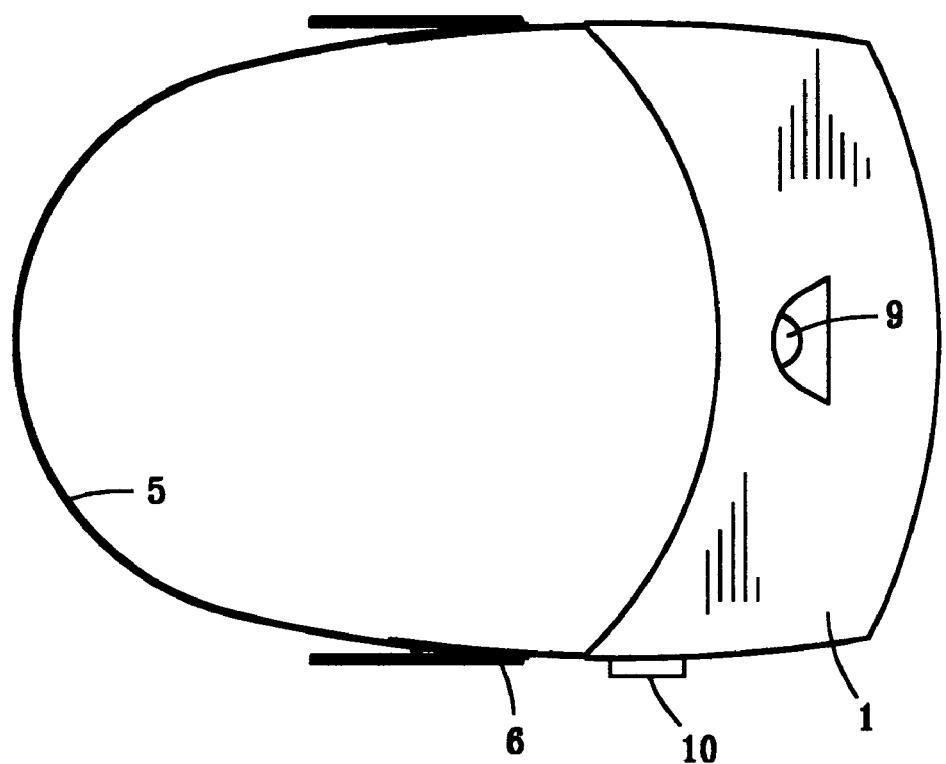
FIG. 3 is a top view of the embodiment of FIG. 1.
Figure 2:
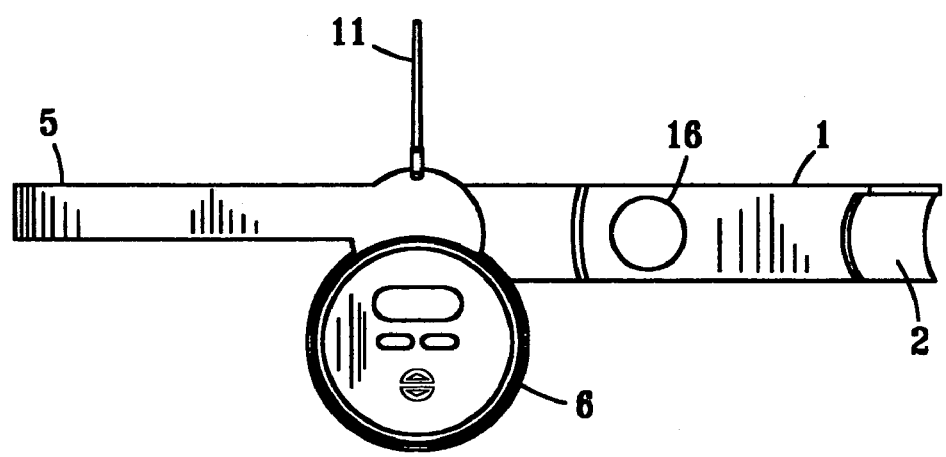
FIG. 2 is a side view of the embodiment of FIG. 1.

FIGS. 1–3 show views of an embodiment of the present invention containing a radio. The visor bill 1 can hold binocular lenses 2 with an optional lens cover 10 that can protect the lenses. This lens cover can be removably attached to the lens assembly or could be mounted on a hinge where it could be swung out of the lens field when not in use. This lens cover can be solid to protect the lens when not in use, or the cover 10 can be optionally tinted for glare protection. A variable tint lens or lens cover that automatically changes its transmission characteristics is also within the scope of the present invention. It is possible to have both active and in-active lens cover (such as variable tint and a solid cover for protection). The side 3 of the visor can be flat or other shape being large enough to contain the lenses 2 and focusing mechanism. An optional focusing knob 9 can be mounted on top of the visor 1 or anywhere else convenient. This knob 9 can be used to control focus at different distances. It is within the scope of the present invention to also use fixed focusing at distance as is known in the art without a focus knob or mechanism. The binocular lenses 2 can also be made adjustable to fit a user's eyes. The binocular lenses can optionally auto-focus.

Optionally a digital camcorder could be coupled to the optical parts of the present invention. In particular, an active recorder with a display such as an LCD display could record video or a series of still shots to create motion picture capabilities. In particular, this would allow a user to review the last play from the game. This process is called generally "progressive shutter capture" or "progressive shutter mode". This and any type of optics could be optionally equipped with a zoom type of lens.

A strap 5 fits around the user's head and can be adjusted to fit different individuals. An optional hinge allows the visor 1 to pivot. The invention can also contain an optionally removable or fixed radio/music module or other electronics 6 mounted anywhere on the invention. This electronics module can include any type of radio apparatus including, but not limited to, AM, FM, combination AM/FM, radio scanner, walkie-talky, cellular telephone, ham radio, CB radio, or any other radio receiver or transceiver. It can optionally contain or totally be a music playback system such as MPEG or other music playback electronics. It can also contain an audio recorder for recording surrounding events or what is being received on the radio.

An earphone or microphone can be located away from the radio/music electronics module 6 using wireless communications such as Bluetooth or any other wireless communications. When one or more wireless earphones are used, the radio/music module can be located anywhere on the head unit or anywhere on the user's body. In fact, a radio/music module could be located external to the particular user and pipe music into the earphone(s) via wireless.

The radio/music module 6, if used, can contain a tuning knob for tuning stations as well as a station indicator 7 and possibly a volume control knob 8. This radio unit 6 can be secured to the head securing strap 5, or other location, by any convenient securing means. The radio can be fixed or removable. Optional removable or fixed ear muffs can be placed over the radio or used in place of it. As has been stated, the radio 6 can be AM or FM or a scanner, or any combination of two of these or all three in a single package.

It is not necessary to have earmuffs for sporting events taking place in the summertime or in any type of warm weather. Therefore, the optional earmuffs can be removed by the user whenever desired. The user may not always want to use the radio equipment. Therefore, that too can optionally be removable. However, the radio can also be fixed on some embodiments of the invention. In fact, the present invention, in general, represents a combination device where the user can pick and choose the optional equipment to be taken to a particular sporting event. In particular, the earmuffs, radio, earphone, and an optional chin strap (not shown in figures) can be removable and can be installed or left off as the user wishes. Thus, the present invention is a method of building up a sports viewing/enjoyment apparatus to fit a custom use.

It should also be noted that the binocular elements 2 shown in FIG. 1 are but one embodiment of binocular elements. It is within the scope of the present invention to combine the two elements into a single assembly, or to use a single optical or telescopic element if desired. The radio can be AM or FM or a combination of AM and FM which is useful for monitoring the sporting event while it progresses, or tuning to relaxing music during the event; as stated, the radio can also be any other type of radio receiver monitoring any channel or frequency band. As stated, the radio/music module can contain an MPEG player as well as a digital recorder.

The earphone can be used with or without the optional earmuffs. When the earmuffs are used for cold weather, the earphone or earphones for two ears can be mounted in the earmuffs so that the user can listen to the radio equipment while simultaneously keeping the ears warm. When the invention is used in warm weather, the earphone or earphones can be removed from the earmuffs and used without them. Other earphones are within the scope of the present invention including the type of earphone that cancels background noise.

A feature of the present invention is the ability to add and remove accessories at the will of the user to customize the system for use at different types of sporting or other events and to carry only the equipment needed or desired on that day.

FIGS. 2–3 show a top view and side view of the embodiment of FIG. 1. The adjustable headstrap 5, focusing knob 9 and optional radio 6 are clearly seen. In addition, the radio can have an optional small vertical antenna 11. It should be remembered that the radio can be any type of radio gear including a cellular telephone. A short vertical antenna 11 as shown in FIG. 2 is most useful for this type of radio. A standard AM or FM radio (or AM/FM combined) can have an internal coiled antenna for more efficiency in the AM band.

The present invention can also contain a removable or fixed camera. This camera can be mechanical, electronic, digital, or any other type of camera known in the art. The preferred location for this optional camera is in the visor between or behind the binocular or optical elements; however it is within the scope of the invention to place the camera anywhere. A button 16 can be placed anywhere on the apparatus to activate the camera and take a photo. It is within the scope of the invention to use automatic film winding or manual winding with another knob located on the visor (not shown) to wind film. It is also within the scope of the invention to use an electronic camera that does not use film, but rather stores images in a memory to be read out later.

Figure 4:
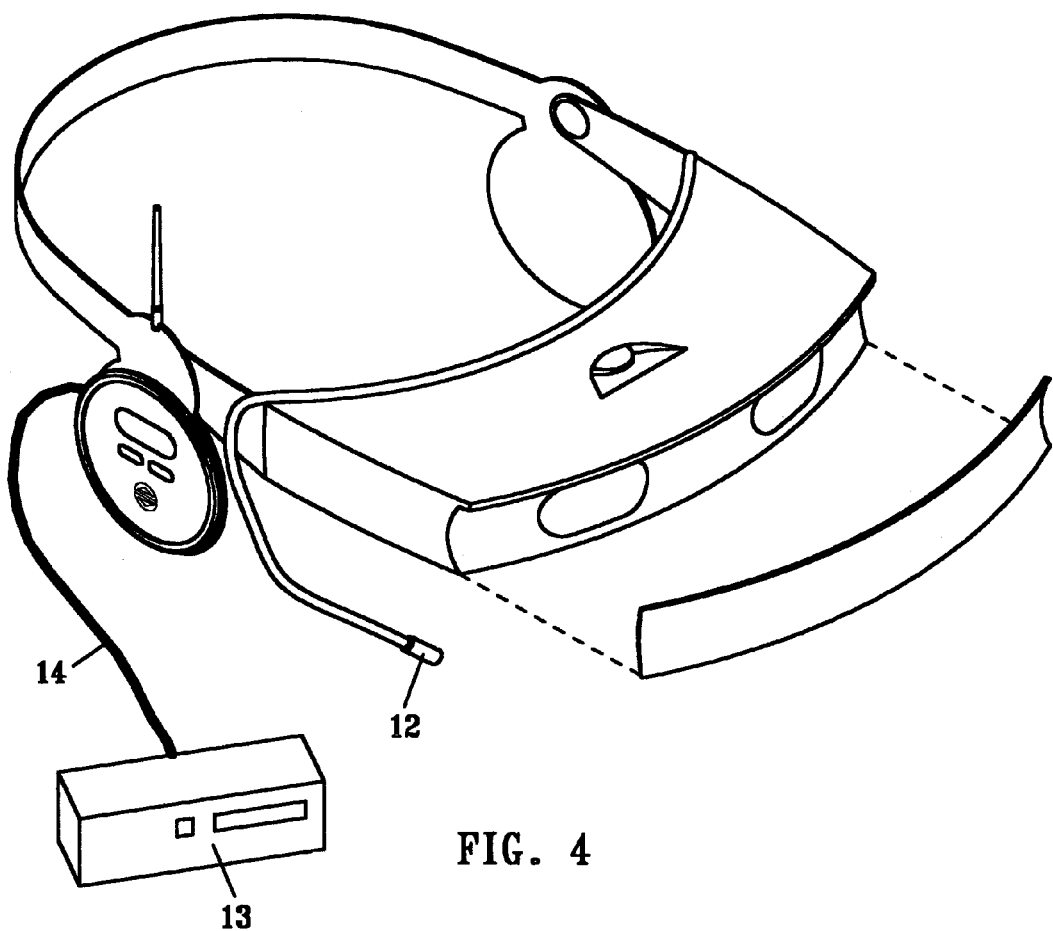
FIG. 4 is a perspective view of an embodiment of the invention containing a microphone.

FIG. 4 shows an embodiment of the present invention with a removable or fixed microphone 12. This is particularly useful when the radio is a cellular telephone or walkie-talky. In addition, an optional cable 14 can be used with an external scanner radio device 13. This is useful for the invention because some scanners are currently too large for convenient mounting on the headgear. Still, the user may want to wear the headgear while watching an event and simultaneously listen to a scanner. In this case, the external scanner can be placed near the user. The scanner could also be mounted on either side of the headband. It is contemplated that scanner technology may become much smaller in the future, and a complete scanner could easily be mounted on the headgear.

Figure 5:
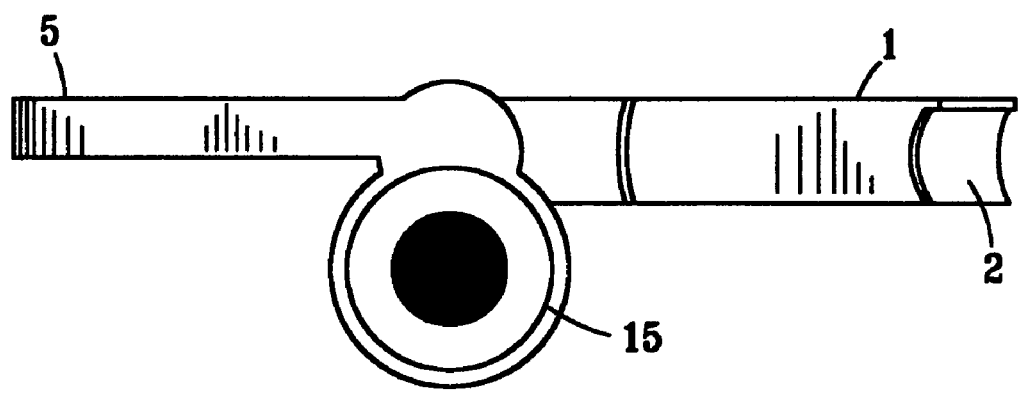
FIG. 5 is a side view of an embodiment of the invention containing earmuffs.

FIG. 5 shows an embodiment of the present invention with removable or fixed earmuffs 15. These earmuffs can be constructed to contain the radio within, or to replace the radio at the user's choosing. As previously stated, a major feature of the present invention is the ability of the user to pick and choose what equipment is taken to a given event. In addition, a coiled up external single or double earphone can also be used with the invention. A jack can be provided on the radio for this external earphone. One or two earphones can be mounted inside the earmuffs for winter comfort with the ability to still use the radio.

Figure 6:
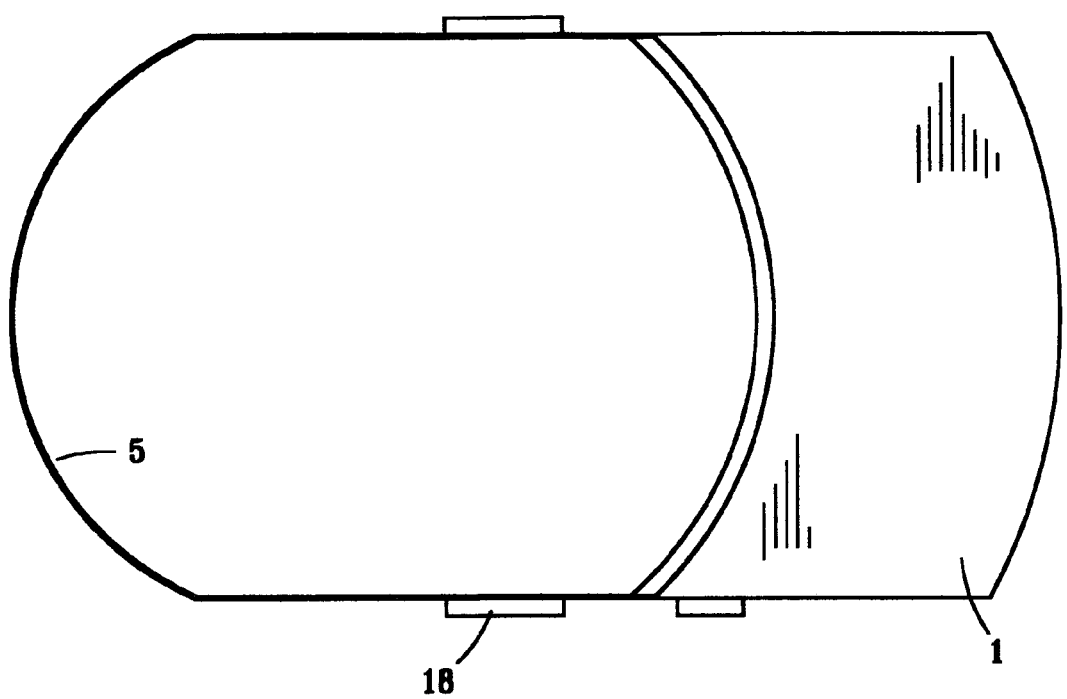
FIGS. 6 and 7 show top and side views of an embodiment with only binoculars and no other equipment.
Figure 7:
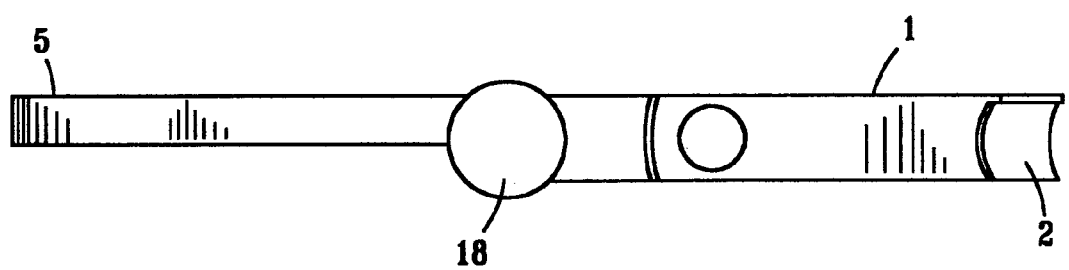

FIGS. 6–7 show an embodiment of the present invention where there are no accessories mounted on the headband 5 other than the binocular lenses. A hinge 18 can allow the visor 1 to pivot up and down, both to position the unit correctly for the user's eyes and to be able to move the lenses up and out of the way when not being used. Upward and downward pivoting is by means of the hinge 18 on the visor. Through this upward and downward pivoting, the present invention can be adjusted to in-use and not in-use position. It is also possible to allow the lenses 2 in this embodiment to adjust both horizontally to fit a user's eyes.

Figure 8:
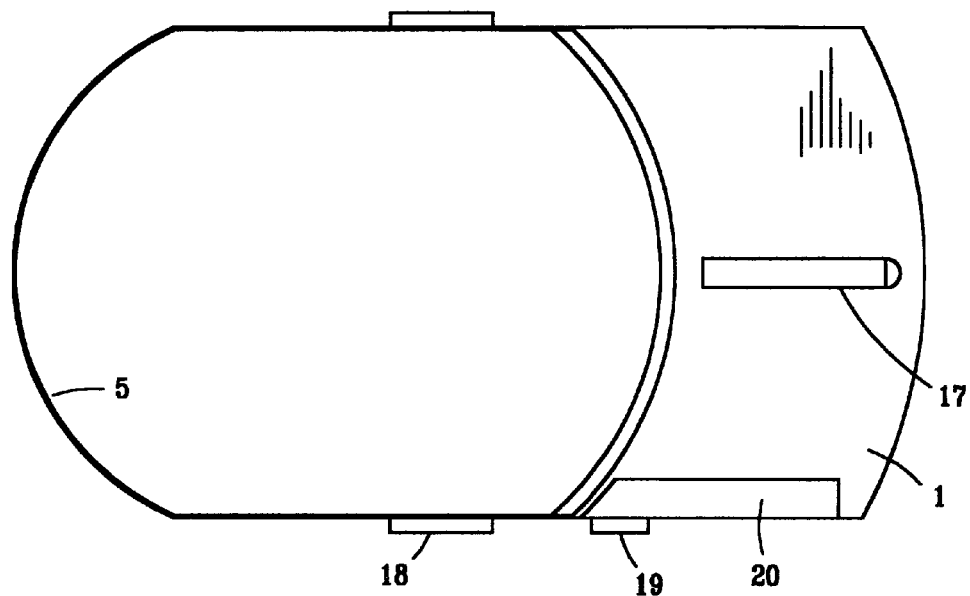
FIGS. 8 and 9 show top and side views of an embodiment with a laser and rangefinder.
Figure 9:
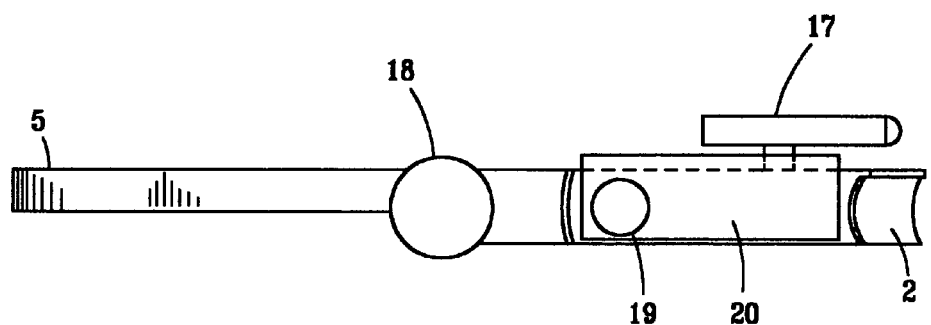

FIGS. 8–9 show an embodiment of the present invention containing a laser pointer 17 and range finder 20. The pointing device 17 can be battery powered and used to locate objects in the field of view. The rangefinder 20 could be equipped with an optional range knob 19. Range could be read out directly from the side of the assembly or combined and read out through the binocular optics. The laser pointer 17 and rangefinder 20 combination could be used in some sports such as archery or hunting to first locate a target and to then find its range in feet or yards or meters.

Each embodiment of the present invention disclosed can contain optional stabilization for the optics. Such stabilization would smooth out or stabilize the effects of vibration and movement which might make viewing difficult. Such stabilization means could be mounted externally to the binoculars 2 or could be an internal part of the optics. Stabilization methods of this type are known in the art as "image stabilization". An example of an optics system employing stabilization is the Canon 8×25 IS binocular system.

All embodiments of the present invention can be supplied in various sizes including women's and children's sizes. All of the features disclosed could appear on a woman's or child's size with the only difference being the size of the headband. Alternatively, the present invention can be made adjustable to fit any head.

Figure 10:
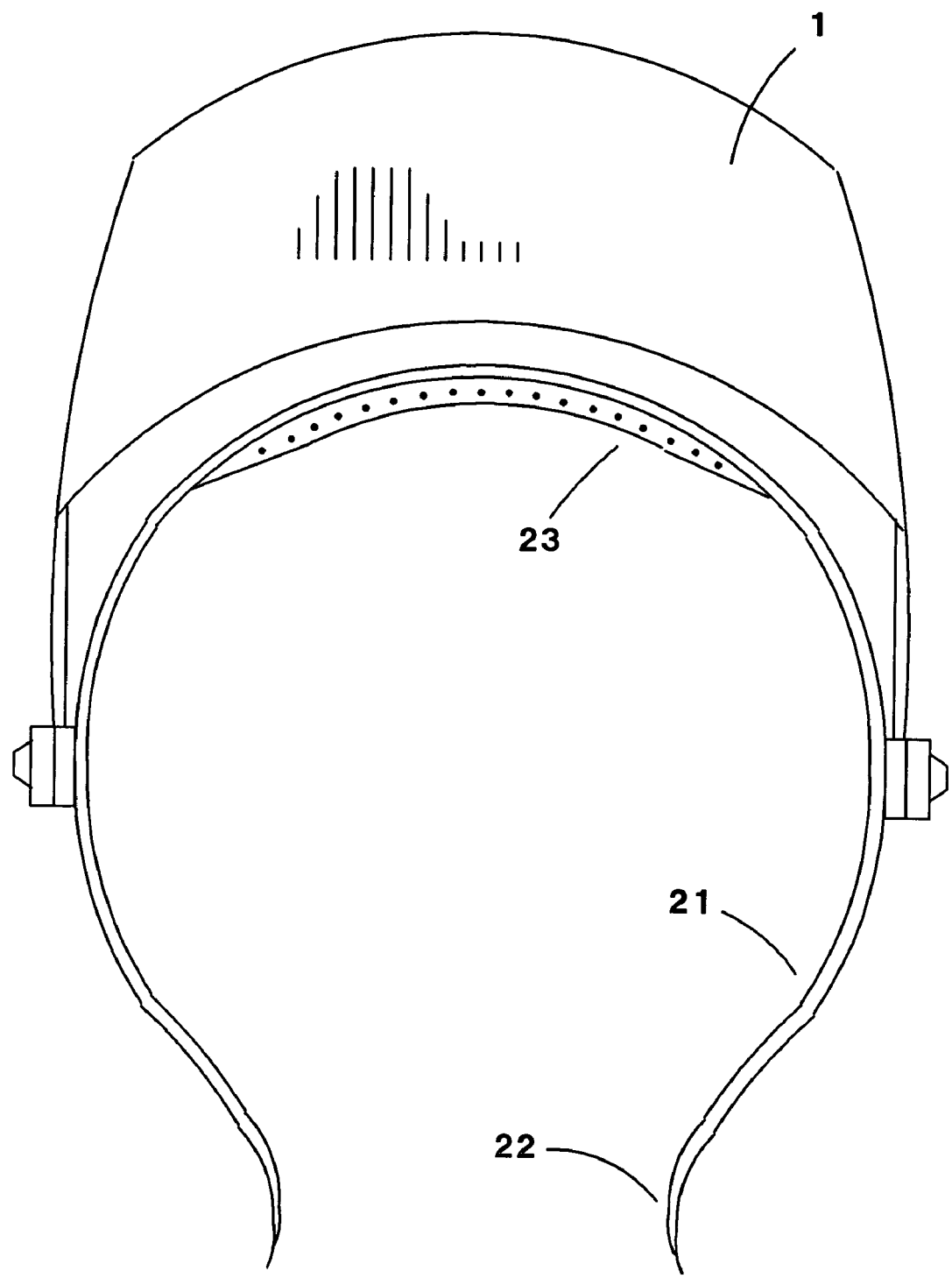
FIG. 10 shows an embodiment using an auto-adjusting headband.

FIG. 10 shows an embodiment of the present invention that uses a different type of headband. In this embodiment, the headband 21 is auto-adjusting. This is accomplished by leaving a gap in the back of the headband and having spring-like ends 22 that move in and out to fit most sizes of heads. An optional pad 23 can be supplied with this embodiment.

Figure 11:
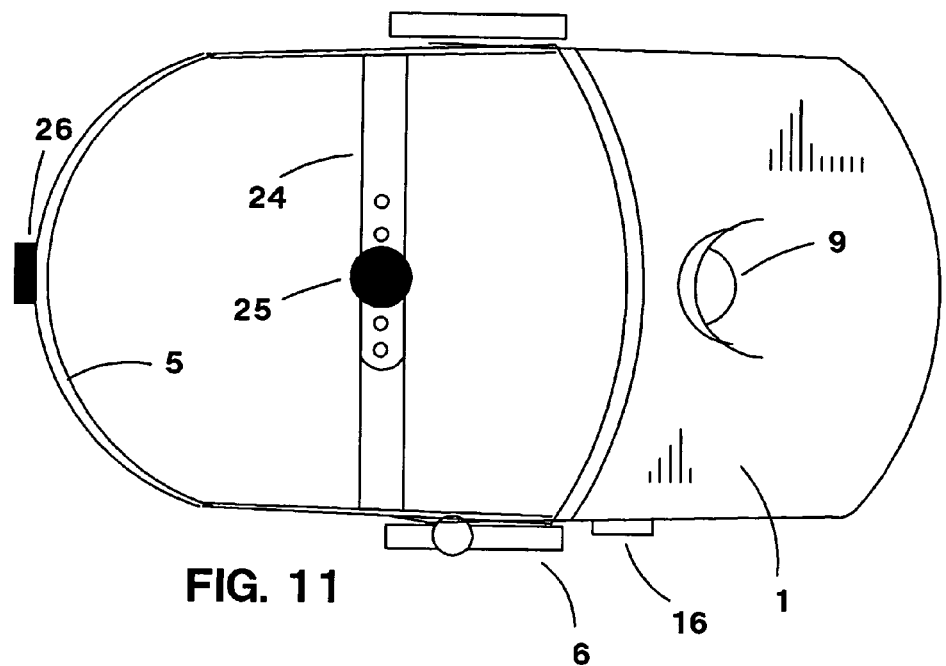
FIGS. 11 and 12 show an embodiment with a top strap.
Figure 12:
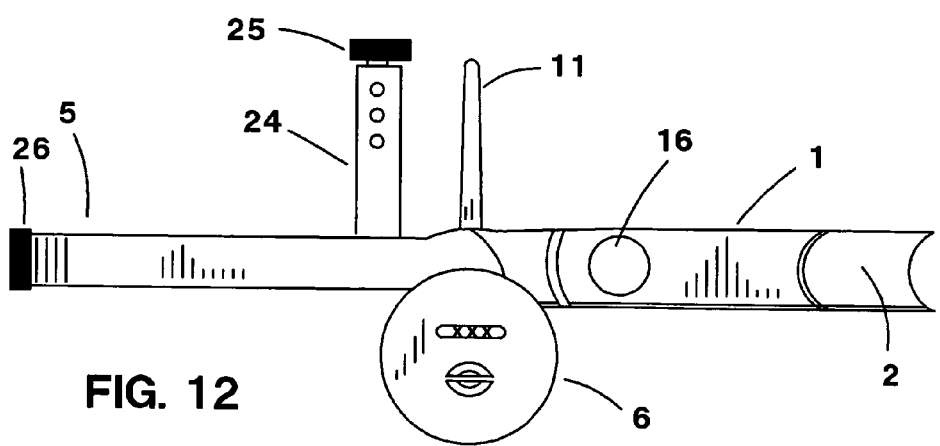

FIGS. 11–12 show an embodiment of a headband that has an adjustment knob 26 at the back of the band 5. By turning this knob 26, the user can tighten or loosen the band. This knob 26 is optional. In addition, an optional top band 24 is shown in FIGS. 11–12. This top band 24 can pass over the top of the user's head to further stabilize the unit. This optional top band 24 can have an optional independent adjustment knob 25 that can indpendently adjust the top band for size.

Figure 13:
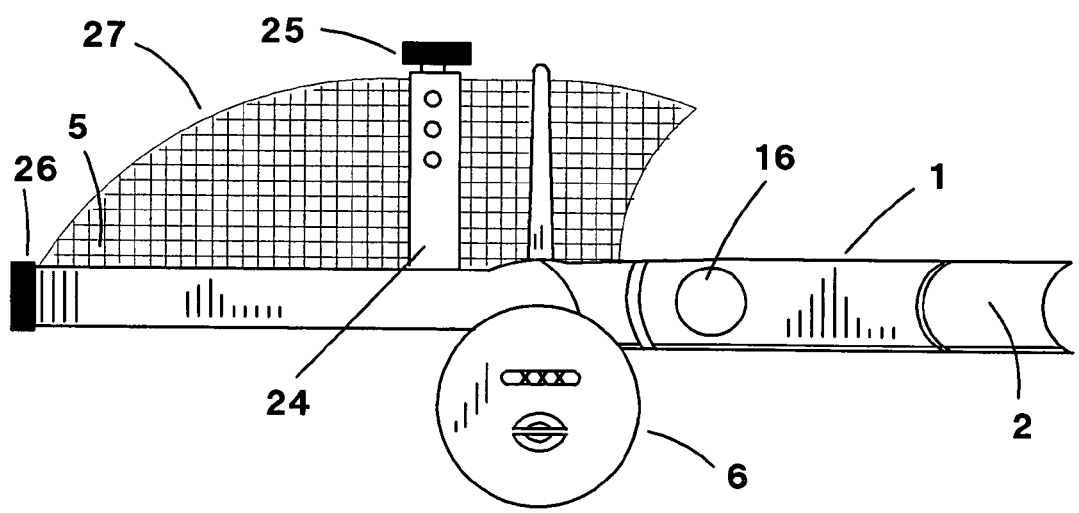
FIG. 13 shows an embodiment with a net for a cooling agent.

FIG. 13 shows an embodiment of the present invention with a net compartment 27 that covers the head. The primary use for this net compartment 27 would be to containing a cold pack. A cold pack could provide heat relief for a user seated in the hot sun. Such packs are available and can be activated by the user whenever wanted. A simpler pack simply containing ice is also possible. While FIG. 13 shows the net 27, the top strap 24 and the adjustment knobs 25, 26, it must be remembered that each of these features is optional. Various models of the present invention can be produced that contain any possible combination of the features herein described.

It should be understood that the examples and illustrations provided herein are to explain and illustrate the invention. It will be appreciated by one skilled in the art that many other changes and variations are within the scope of the present invention. It should be remembered that the scope of the invention is determined from the claims that follow and is in no way limited to the examples or illustrations given in the specification.

I claim:

1. A sports viewing apparatus comprising, in combination:
   an adjustable head support;
   at least one telescopic device coupled to said head support;
   an electronics module attached to said apparatus;
   at least one earphone attached to said head support, said earphone coupled to said electronics module.

2. The sports viewing apparatus of claim 1 wherein said electronics module is removable.

3. The sports viewing apparatus of claim 1 wherein said earphone is wireless.

4. The sports viewing apparatus of claim 1 further comprising earmuffs removably attached to said head support.

5. The sports viewing apparatus of claim 1 further comprising a microphone removably attached to said head support.

6. The sports viewing apparatus of claim 1 further comprising a means for holding a cold pack, said means removably attached to said head support.

7. The sports viewing apparatus of claim 1 further comprising a top strap removably attached to said head support.

8. The sports viewing apparatus of claim 7 wherein said top strap is adjustable.

9. A system for comfortably viewing of sporting events including an adjustable headstrap coupled to an optical means for viewing a sporting event, said optical means being adjustable to fit a user's eyes and pivotable to pivot upward and downward to adjust to a user's preferred viewing position said system containing an electronics module mounted on said headstrap or said optical means.

10. The system of claim 9 wherein said electronics module includes components chosen from the group consisting of a radio, an MPEG player, a digital recorder, a scanner.

11. The system of claim 9 wherein the optical means includes a camcorder.

12. The system of claim 9 wherein the optical means includes a progressive shutter capture mode camera.

13. The system of claim 9 wherein the optical means includes a zoom lens.

14. The system of claim 9 wherein the optical means includes an auto-focus lens.

* * * * *